(12) United States Patent
Smith et al.

(10) Patent No.: US 12,358,739 B1
(45) Date of Patent: Jul. 15, 2025

(54) SYSTEMS AND METHODS FOR MODIFYING LOADING DOCK ENVIRONMENTS TO ENABLE TRAILER SWING DOORS TO OPEN INSIDE OF A LOADING DOCK

(71) Applicant: Outrider Technologies, Inc., Golden, CO (US)

(72) Inventors: Andrew F. Smith, Bend, OR (US); Lawrence S. Klein, Bend, OR (US); Joseph A. Welsh, Golden, CO (US); JohnDavid A. Arnott, Downers Grove, IL (US); Chandler R. Deimund, Edwards, CO (US); Jason L. Williams, Bloomingdale, IL (US)

(73) Assignee: Outrider Technologies. Inc., Brighton, CO (US)

( * ) Notice: Subject to any disclaimer, the term of this patent is extended or adjusted under 35 U.S.C. 154(b) by 150 days.

(21) Appl. No.: 18/084,439

(22) Filed: Dec. 19, 2022

Related U.S. Application Data

(63) Continuation of application No. 17/003,798, filed on Aug. 26, 2020, now Pat. No. 11,530,100, which is a continuation-in-part of application No. 16/937,368, filed on Jul. 23, 2020, now Pat. No. 11,325,795.

(60) Provisional application No. 62/877,349, filed on Jul. 23, 2019.

(51) Int. Cl.
*B65G 69/28* (2006.01)
*B60J 5/10* (2006.01)
*B60P 1/64* (2006.01)

(52) U.S. Cl.
CPC .......... *B65G 69/2811* (2013.01); *B60J 5/108* (2013.01); *B60P 1/6418* (2013.01); *B65G 69/2876* (2013.01)

(58) Field of Classification Search
CPC .. B65G 69/287; B65G 69/2894; B65G 69/28; B65G 69/2805; B65G 69/003; B65G 69/006; B65G 69/2876; B65G 69/2811; B60J 5/108
See application file for complete search history.

(56) References Cited

U.S. PATENT DOCUMENTS

| | | | |
|---|---|---|---|
| 4,554,768 A | 11/1985 | Srajer | |
| 5,382,131 A * | 1/1995 | Werthmann | .......... B66F 19/005 294/94 |
| 6,068,042 A | 5/2000 | Blond | |
| 6,202,985 B1 * | 3/2001 | Chong | .................... B66F 15/00 254/131 |
| 6,279,276 B1 | 8/2001 | Knoll | |
| 6,282,822 B1 | 9/2001 | Rinzler | |
| 6,354,570 B1 * | 3/2002 | Christensen | ............ B66F 15/00 254/131 |

(Continued)

*Primary Examiner* — Abigail A Risic
(74) *Attorney, Agent, or Firm* — Loginov & Associates, PLLC; William A. Loginov

(57) ABSTRACT

Systems and methods for the modification of loading dock environments are provided that allow trailers and shipping containers on chassis' to park at a loading dock with closed doors and have these doors opened into the loading dock environment and resealed while the trailer remains at the loading dock. A resilient, semi-rigid protective panel can also be removably attached to cover part of the inside face of an opened trailer door, so as to protect it from impact by equipment or goods as they pass into and out of the trailer.

14 Claims, 8 Drawing Sheets

(56) References Cited

U.S. PATENT DOCUMENTS

| | | | |
|---|---|---|---|
| 6,412,835 B1 | 7/2002 | Patterson | |
| 6,607,337 B1 | 8/2003 | Bullock | |
| 7,503,743 B1 * | 3/2009 | Friedrich | B66F 19/005 254/131 |
| 7,544,035 B1 * | 6/2009 | Friedrich | B66F 19/005 254/8 R |
| 8,308,417 B1 | 11/2012 | Verrochi | |
| 8,517,341 B2 * | 8/2013 | Edwards | B66F 15/00 254/129 |
| 9,944,474 B2 | 4/2018 | Heim | |
| 2005/0271490 A1 | 12/2005 | Thomson | |
| 2009/0019747 A1 | 1/2009 | Rosa | |
| 2011/0010871 A1 | 1/2011 | Metz | |
| 2011/0061185 A1 | 3/2011 | Kimener | |
| 2016/0340963 A1 | 11/2016 | Loch | |
| 2018/0111466 A1 | 4/2018 | Ching | |
| 2019/0210508 A1 | 7/2019 | Donaldson | |

* cited by examiner

SYSTEMS AND METHODS FOR MODIFYING LOADING DOCK ENVIRONMENTS TO ENABLE TRAILER SWING DOORS TO OPEN INSIDE OF A LOADING DOCK

RELATED APPLICATION

This application is a continuation of co-pending U.S. patent application Ser. No. 17/003,798, entitled SYSTEMS AND METHODS FOR MODIFYING LOADING DOCK ENVIRONMENTS TO ENABLE TRAILER SWING DOORS TO OPEN INSIDE OF A LOADING DOCK, filed Aug. 26, 2020, which is a continuation-in-part of co-pending U.S. patent application Ser. No. 16/937,368, entitled SYSTEMS AND METHODS FOR MODIFYING LOADING DOCK ENVIRONMENTS TO ENABLE TRAILER SWING DOORS TO OPEN INSIDE OF A LOADING DOCK, filed Jul. 23, 2020, now U.S. Pat. No. 11,325,795, issued May 10, 2022, which claims the benefit of U.S. Provisional Application Ser. No. 62/877,349, entitled SYSTEMS AND METHODS FOR MODIFYING LOADING DOCK ENVIRONMENTS TO ENABLE TRAILER SWING DOORS TO OPEN INSIDE OF A LOADING DOCK, filed Jul. 23, 2019, the teachings of each of which applications are expressly incorporated herein by reference.

FIELD OF THE INVENTION

This invention relates to swing door trailers and shipping containers on chassis used to haul cargo around a shipping facility, a production facility or yard, and more particularly to the opening and closing of swing doors at loading dock environments.

BACKGROUND OF THE INVENTION

In distribution center environments, it is becoming more preferable to perform trailer swing door operations once a trailer has already been parked at a loading dock. One large reason for this is the increase in facility autonomy. With the absence of truck drivers, who have historically been responsible for opening swing doors prior to reversing to a loading dock, a modified dock that allows trailer swing doors to open inside of the loading dock environment is a significant advantage. In order for this to be successful with certain loading dock environments, often it is necessary to make modifications the loading dock design. Various commercially available systems have been developed to facilitate automated docking, motivated by the myriad benefits, such as human and product safety, operational efficiency, and autonomous technology compatibility, several of which are so-called "drive-through" concepts and technologies. Examples of such vendors include Rite-Hite, Dockzilla, and Blue Giant. However, to date, there have not been any that exhibit low construction impact, low cost, and otherwise avoid equipment-intensive installations. Hence, such a solution is highly desirable.

Additionally, where situations exist in which doors may not be opened fully at a loading dock—typically folded completely against the sides of the trailer, there is a risk that equipment (e.g. forklifts) and goods on the move may contact the doors and cause significant damage. Mechanisms and associated techniques that limit such damage are desirable.

SUMMARY OF THE INVENTION

This invention overcomes disadvantages of the prior art by providing systems and methods for the modification of loading dock environments that would allow trailers and shipping containers on chassis' to park at a loading dock with closed doors and have these doors opened into the loading dock environment and resealed while the trailer remains at the loading dock.

In an illustrative embodiment, a system and method for modifying a loading dock is provided. It includes, removing material from each of opposing edges of a loading dock pit to accommodate locking lugs of trailer swing doors when swung open. The leveler deck in the pit (also termed "pit leveler deck") is adapted to be lowered to a position that enables the locking lugs to pass over the deck while being swung open toward the shelves. A restraint is also provided, which maintains the doors in the swung open position. The deck can be adapted by arranging safety legs of the deck so as to be movable out of a supporting position. A tool can also be provided for a user, which removably engages a link attached to the safety legs and selectively moves the legs out of the supporting position upon actuation of the tool. Illustratively, the tool comprises an angled bar having a handle adjacent to a proximal end and a hook, for engaging the link, adjacent to an opposing distal end. The bar can include wheels that provide a fulcrum adjacent to an angled joint in the bar. Illustratively, the deck includes a hole enabling the hook to access the link, the link can comprise a chain or cable interconnected with the legs. The restraint can be adapted to locate the swing door so as to be generally behind by a protective device. It can comprise a cable, chain, strap, rope bungee cord or other acceptable device. Additionally, the protective device can comprise a newly placed, or pre-existing, bollard or other upright projecting structure.

In an illustrative embodiment, a loading dock comprises opposing edges of a loading dock pit that accommodate locking lugs of trailer swing doors when swung open. A leveler deck in the pit is adapted to be lowered to a position, which enables the locking lugs to pass over the deck while being swung open toward the shelves, and a restraint maintains the doors in the swung open position. Illustratively, the safety legs of the deck are adapted so as to be movable out of a supporting position. A tool can be provided that removably engages a link attached to the safety legs and that selectively moves the legs out of the supporting position upon actuation of the tool. The tool can comprise an angled bar having a handle adjacent to a proximal end and a hook, for engaging the link, adjacent to an opposing distal end. The bar can include wheels that provide a fulcrum adjacent to an angled joint in the bar, and/or the deck includes a hole enabling the hook to access the link. The link can comprise a chain or cable interconnected with the legs. The restraint is adapted to locate the swing door so as to be generally behind by a protective device. The protective device can comprise a bollard or other upright projecting structure.

In an illustrative embodiment, a tool for use in a loading dock having opposing edges of a loading dock pit that accommodate locking lugs of trailer swing doors when swung open, a leveler deck in the pit adapted to be lowered to a position that enables the locking lugs to pass over the deck while being swung open toward the shelves, a restraint that maintains the doors in the swung open position, wherein the safety legs of the deck are adapted so as to be movable out of a supporting position is provided. The tool is constructed and arranged to removably engage a link attached to the safety legs and to selectively move the legs out of the supporting position upon actuation of the tool. Illustratively, the tool can comprise an angled bar having a handle adjacent to a proximal end and a hook, for engaging the link, adjacent to an opposing distal end, and the bar includes wheels that provide a fulcrum adjacent to an angled joint in the bar.

In another illustrative embodiment, a system for protecting a trailer rear door that is partially opened (i.e. not fully folded against the sides of the trailer), includes a resilient panel that is sized and arranged to engage a lower, inside face of the door and cover the inside face so as to deflect impacts thereagainst and reduce potential damage therefrom. The resilient panel can include in inner edge that defines an inward fold adapted to pass around the inner edge of the door adjacent the door hinges. The panel can include one or more (e.g.) metal J-hooks that are arranged on the panel to overlie selected hinges of the trailer door and thereby vertically stabilize the panel against gravity. The panel can include one or more straps that extend outwardly from the outward edge of the panel (and trailer door) and secure both the panel and door (against removal, folding, etc.) when secured to a loading dock bollard, railing, etc. In this orientation the door is sufficiently opened (e.g. beyond 90 degrees relative to the closed position) to allow for passage of equipment and goods free of interference therebetween.

In a further exemplary embodiment, a method for modifying a loading dock includes (a) removing material from each of opposing edges of a loading dock pit to accommodate locking lugs of trailer swing doors when swung open; (b) adapting a leveler deck in the pit to be lowered to a position that enables the locking lugs to pass over the deck while being swung open toward the shelves; and (c) providing a restraint that maintains the doors in the swung open position, including affixing a protective panel to an inside face of at least of portion of at least one of the doors. The method can further include engaging of an inside edge of one of the doors in a location residing adjacent to a top of one of the hinges of the one of the doors with a hook attached to the protective panel. At least one elongated flexible member can be attached to an edge of the panel, and to a stationary object residing remote from a front edge of the one of the doors, such that the elongated flexible member is made taut to secure the door and the panel together. The stationary support can comprise at least one of a post, a railing and a bollard, and/or the elongated flexible member can comprise at least one of a non-elastic strap, an elastic strap, a shock cord, a non-elastic cord, and a cable. The protective sheet can be constructed from a resilient, semi-rigid polymer.

In another exemplary embodiment, a method for protecting and securing a trailer door in an opened position at a loading dock includes (a) locating the trailer door in a swung open orientation approximately beyond 90-degrees relative to a closed orientation; (b) applying a protective panel constructed from a resilient material so that a first hook thereof, located at an inner edge of the protective panel, engages an inner edge of the trailer door in a location residing in contact with a top end of a first hinge of the trailer door; and (c) engaging a stationary object with a substantially taut, elongated flexible member that extends from an attachment location on a front edge of the protective panel to the stationary object, and is secured thereto. The protective panel can be applied to the door so that a second hook thereof, located at the inner edge of the protective panel, engages the inner edge of the trailer door in a location residing in contact with a top end of a second hinge of the trailer door. The elongated flexible member can be engaged, and made taut, to stationary object by clamping, buckling, tying and/or adhering at least one of a non-elastic strap, an elastic strap, a shock cord, a non-elastic cord, and a cable.

The mounting locations of the at least one of the first hook and the second hook can be adjusted relative to the protective panel based upon locations of hinges on the trailer door. The adjustment/mounting of the first and/or second hook can be performed by bolting at least one of the first hook and the second hook into one of a plurality of sets of predrilled holes on the protective panel. The protective panel can be located on the trailed door so that an inwardly angled flap, unitary therewith, covers at least a portion of the inner edge of the trailer door, so mas to deflect any catching by equipment or goods of the door inner edge.

In an exemplary embodiment, a protective panel for covering and securing a trailer door is provided. The protective panel defines a resilient material sheet with a first hook, located at an inner edge, which engages an inner edge of the trailer door in a location residing in contact with a top end of a first hinge of the trailer door. A substantially taut, elongated flexible member extends from an attachment location on a front edge of the sheet to the stationary object, and is secured thereto. Illustratively, a second hook is located at the inner edge of the sheet, which engages the inner edge of the trailer door in a location residing in contact with a top end of a second hinge of the trailer door. The elongated flexible member can comprise at least one of a non-elastic strap, an elastic strap, a shock cord, a non-elastic cord, and a cable. In an exemplary embodiment, a plurality of non-elastic straps, elastic straps, shock cords, non-elastic cords, or cables can extend from respective attachment locations on the front edge of the protective panel to the stationary object, and are secured thereto. Mounting locations for at least one of the first hook and the second hook can be positioned on the sheet based upon locations of hinges on the trailer door. Illustratively, at least one of the first hook and the second hook can be affixed by fasteners to one of a plurality of sets of predrilled holes on the sheet. The sheet can further include an inwardly angled flap, constructed in a unitary manner therewith, that is constructed and arranged to cover at least a portion of the inner edge of the trailer door

BRIEF DESCRIPTION OF THE DRAWINGS

The invention description below refers to the accompanying drawings, of which.

DETAILED DESCRIPTION

I. Modified Pit Leveler

Figure 1:
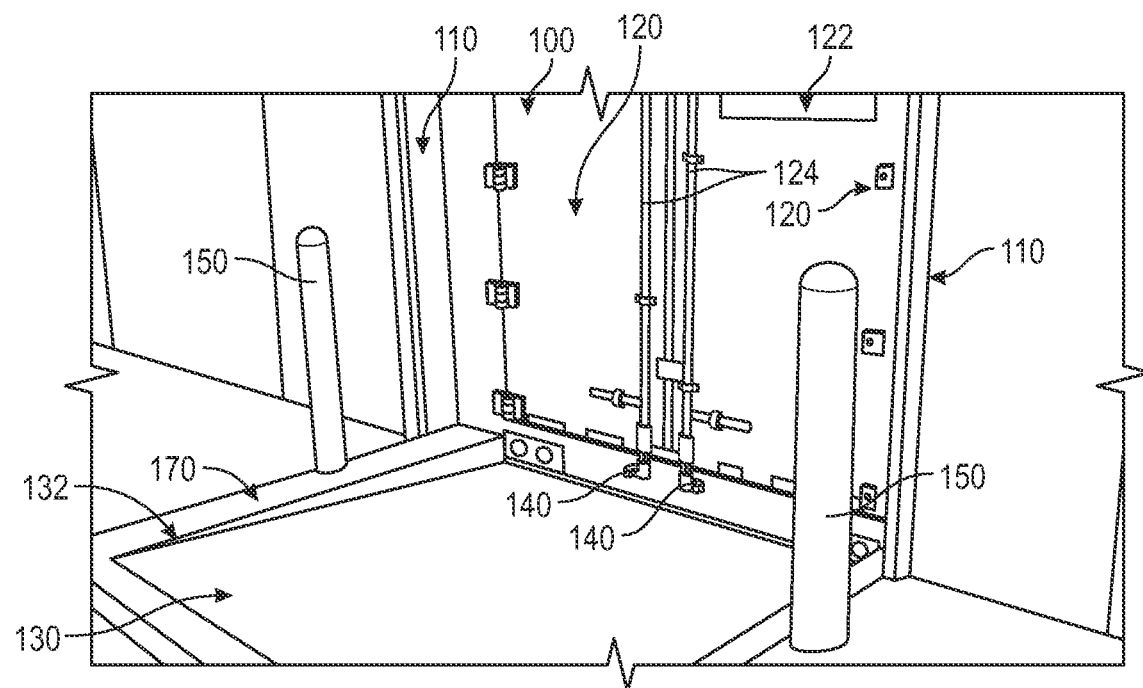
FIG. 1 is a diagram of a loading dock environment and exemplary trailer by way of example of the principles of the system and method.
Figure 2:
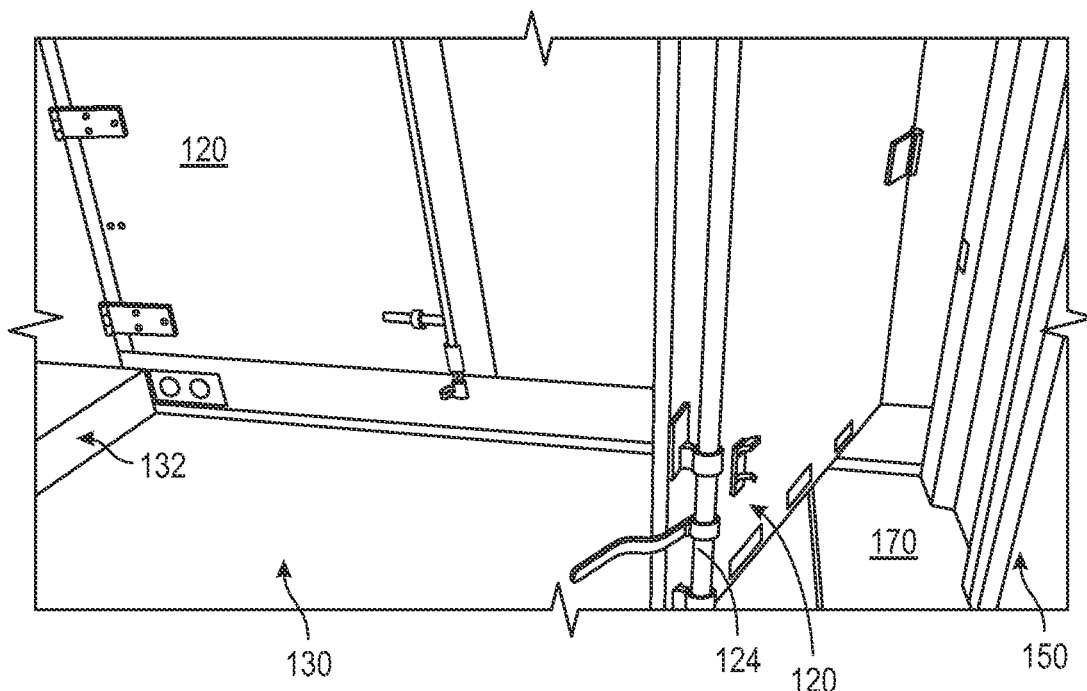
FIG. 2 is a more detailed diagram of an opened trailer door and associated locking mechanism for the exemplary trailer of FIG. 1.
Figure 3:
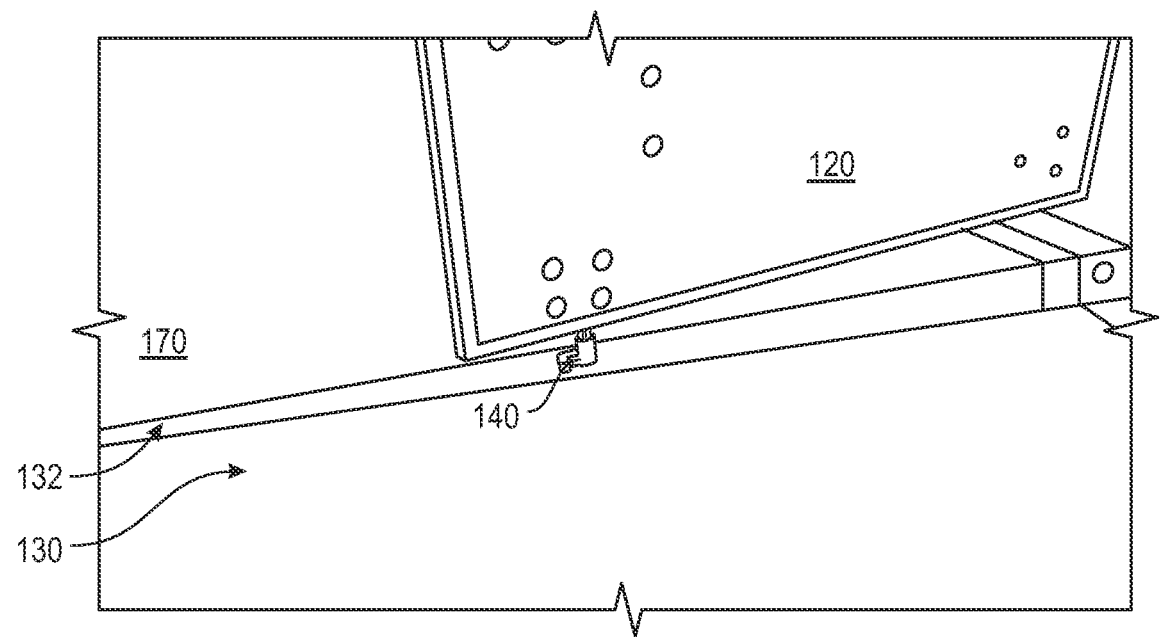
FIG. 3 is a more detailed diagram of the bottom end of a swing door of the exemplary trailer of FIG. 1 showing interference between the locking lug of the locking cam rod and the edge of the loading dock pit, while the pit leveler deck is in a lowered position to allow clearance for the lug.

FIG. 1 shows an interior view of a loading dock environment 100 in which the system and method herein is employed. The environment 100 includes a door frame 110 that defines (or is rebuilt to define) sufficient width and height so that the outer perimeter of the doors 120 of the exemplary trailer 122 can reside within the frame 110. The doors 120 each include one or more cam locks and rods 124 of conventional design. These locks are shown as manually operable (FIG. 2 below) to allow the doors to unlock and swing open. A dock pit leveler plate or deck 130 is typically provided within a surrounding pit 132 formed in the concrete. In a conventional implementation, the pit leveler deck 130 is provided on legs, and can be raised and lowered as appropriate to align with a given trailer floor height. At full height, as shown in FIG. 3, the leveler deck 130 can effectively block the inward swing of the doors 120 by interference with the bottom cam lock lugs 140 of the locking rods 124. However, most leveler decks 130 can be lowered sufficiently to allow for clearance of these cams as shown in FIG. 3.

Figure 6:
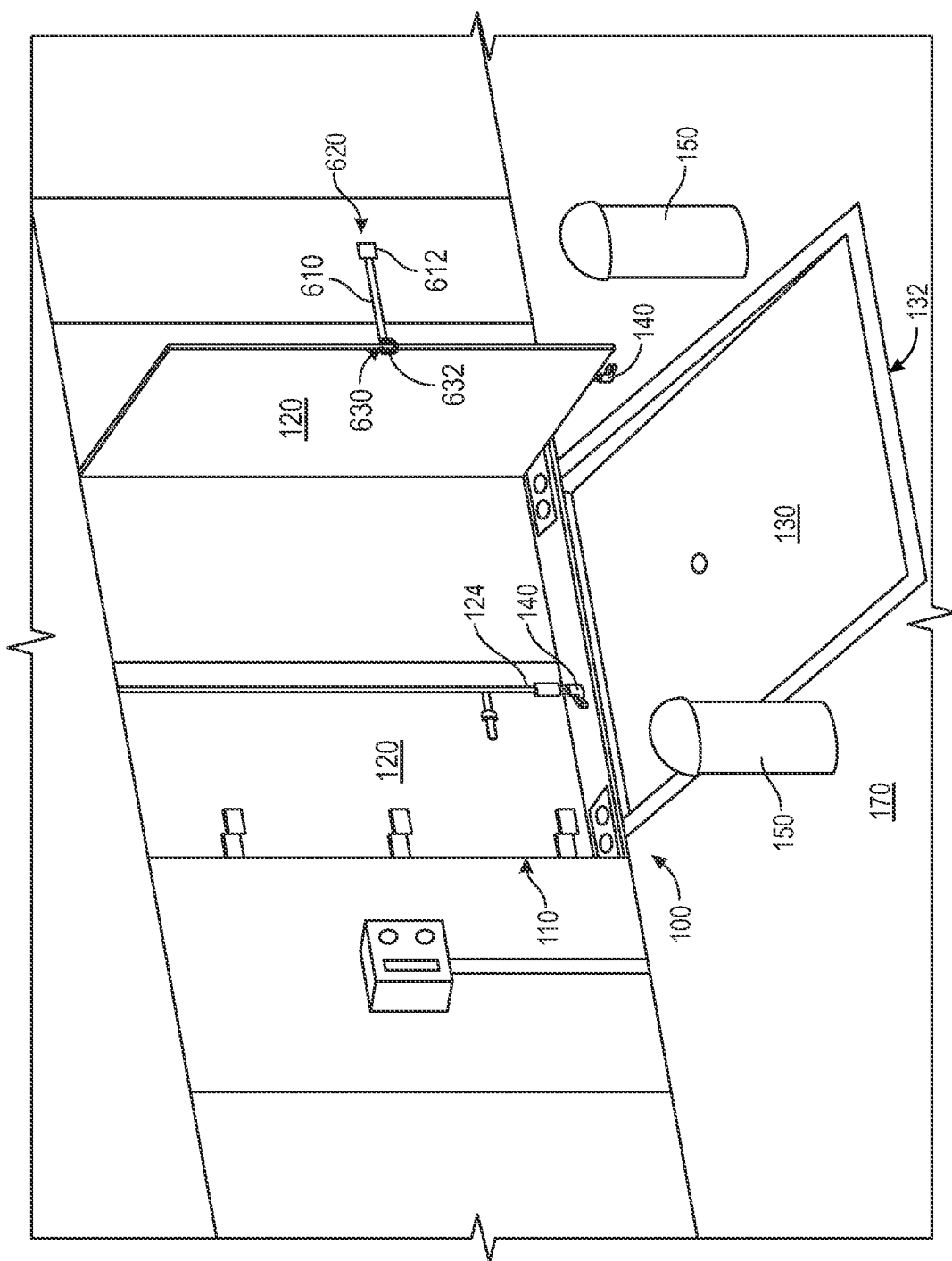
FIG. 6 is a diagram of the loading dock environment of FIG. 1 showing doors of the exemplary trailer opened, secured and protected from damage.

The dock environment 100 also typically includes bollards 150 on each of opposing sides of the well or pit 132. These are typically arranged at sufficient width to avoid interference with doors 120 as they swing open, and can provide an effective engagement surface for securing doors once they are swung open. More particularly, it is desirable to protect the swing doors during warehouse processes, such as trailer loading and unloading operations. Once the swing doors are fixed in the open position, they are susceptible to impact or snagging by forklifts or pallets, etc. In order to avoid this hazard, an impact protection device, such as the bollard (or another form of rail, and/or more general deflector device is placed on the leading edge (near the frame 110) of the pit 132, so that the swing door 120 is protected behind and away from the mounted protection device/bollard (FIG. 6).

In an exemplary embodiment, each of the doors 124 can be affixed in the open position by an adjustable or flexible strap 610 (FIG. 6) that has a distal end 612 affixed to a bollard 150, wall 620 (as shown herein) or other fixed object, while the proximal end 630 of the strap 610 has an end-effector, such as a hook 632, that attaches to the leading edge of the swing door 120 or around the cam lock bar 124, such that its tension maintains the door 120 in an open position.

Figure 4:
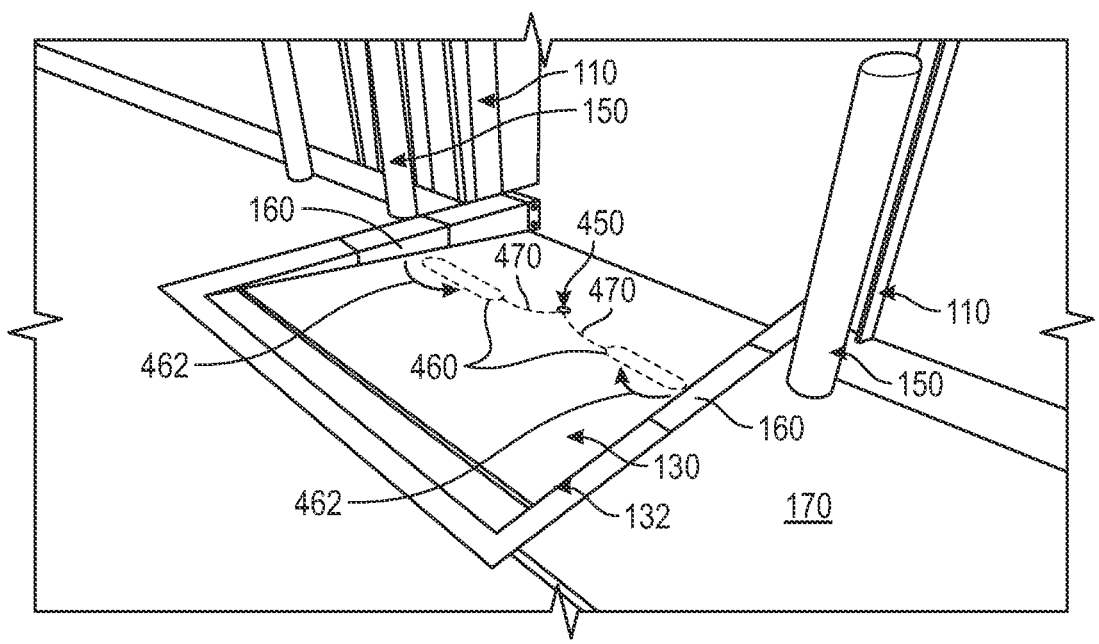
FIG. 4 is a more detailed diagram of the loading dock environment of FIG. 1 showing the pit leveler deck in a lowered position and the locations of two cutout shelves to allow the doors to swing into a fully opened position in engagement with adjacent protective structures (e.g. bollards) according to the illustrative system and method herein.
Figure 5:
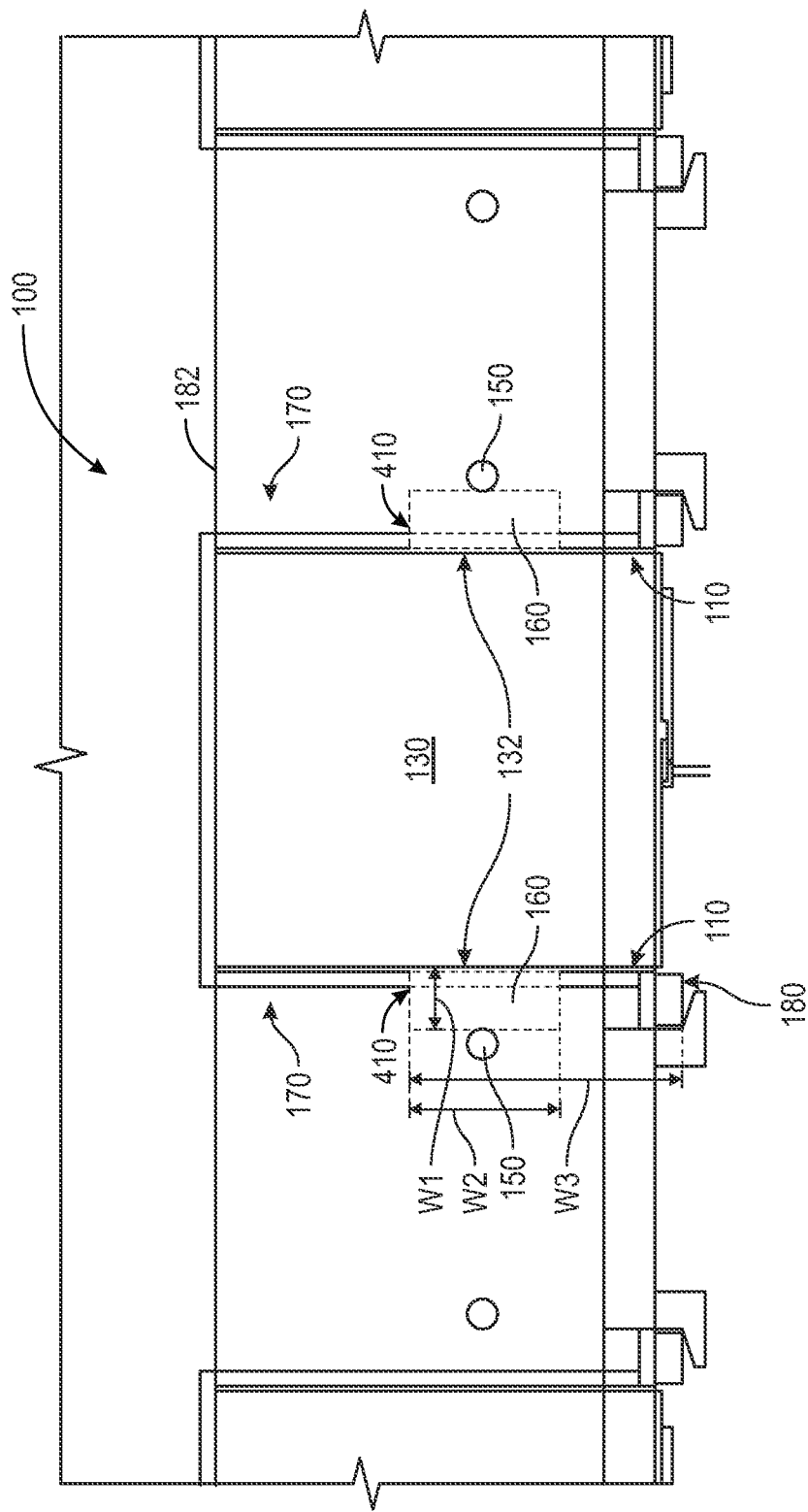
FIG. 5 is a plan view of the loading dock environment of FIG. 1 showing locations and dimensions of the shelves of FIG. 4 according to the illustrative system and method herein.

To allow the doors 120 to swing more fully out of the pit 132, in an exemplary embodiment, the edge of the pit is modified to accommodate, and remove interference with, the door cam lock lugs 140. As shown in FIGS. 4 and 5, the concrete edges of the pit 132 are cut down approximately 3-4 inches in depth below the level of the concrete floor 170 surrounding the pit 132, and define a well that is approximately 24-48 inches in length, approximately 12-16 inches in width) to create a lowered shelf 160. The existing concrete construction joint (by way of example) 180 is shown at the rear edge of each pit 132. The shelves 160 are located on each opposing side 132 of the pit 132 as shown. As shown (FIG. 4), the rear edge 410 of each shelf 160 is set back approximately 4-6 feet from the front of the door frame 110. The length of the shelf should be sufficient to accommodate doors with multiple locking rods and associated cam lock lugs. More particularly, the cut-down shelves 160 reside such that the swing door 120, or primarily the cam lock lug 140 of the door latch rod 124, can open and clear the area defined by the pit 132, to then be pinned back against to bollards 150 or other protective structure. Once pinned back, the pit leveler deck 130 can again be raised up to position that confronts the floor of the trailer 122, while not damaging the opened swing doors 120. Note, in various embodiments, the depth, length, and width of the concrete cut for each shelf can be tailored more specifically, depending upon the existing dock environment, as well as the make and model of the trailer being docked.

As shown in FIG. 5, the cut-down shelves can have a width W1 of approximately 10-12 inches (e.g. 11.5 inches in an embodiment), a length of approximately 2-3 feet (e.g. 2.5 feet in an embodiment) and a dock front (180) to rear-end setback W3 of approximately 4-5 feet (e.g. 4.5 feet in an embodiment). These dimensions are highly variable in alternate embodiments.

Figure 7:
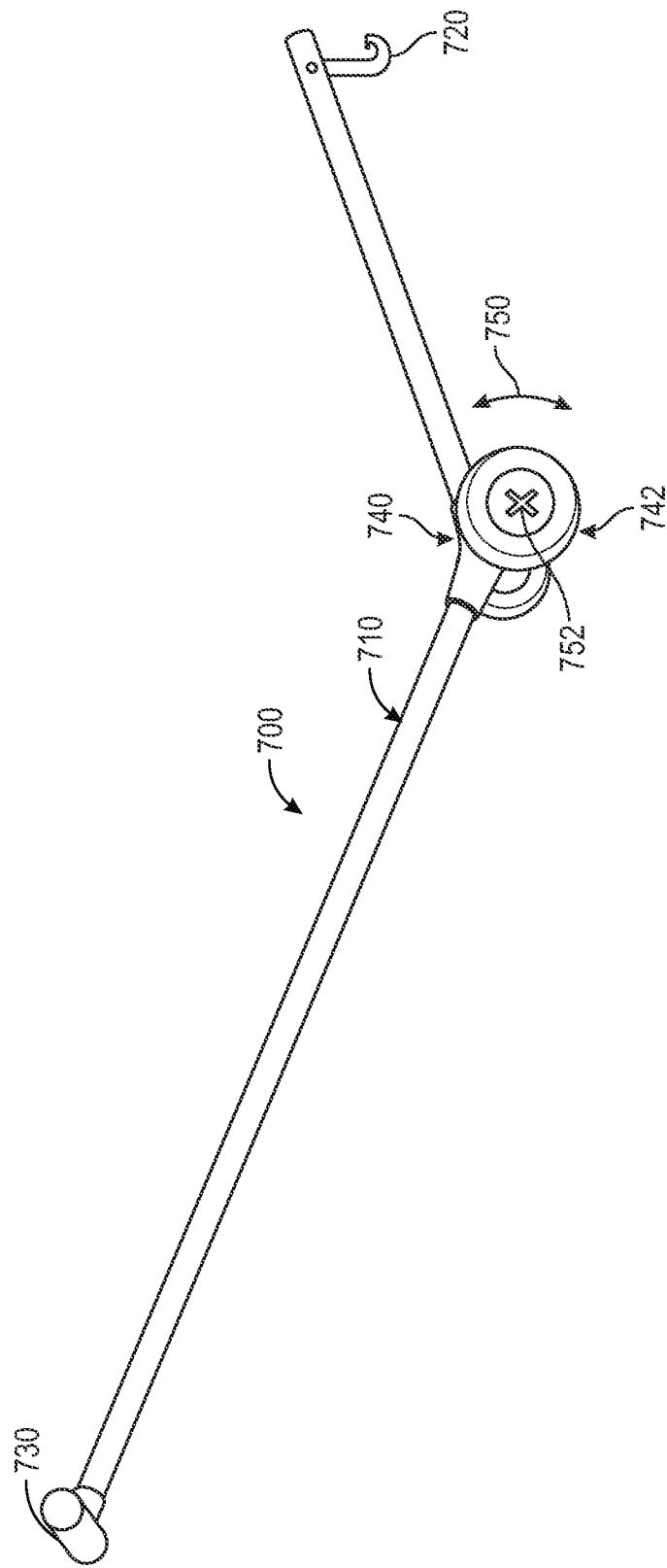
FIG. 7 is a diagram of a pit leveler deck tool that allows selective lowering and raising of the pit leveler deck when doors are to be swung open, in accordance with an exemplary embodiment of the illustrative system, and method herein.

It is contemplated that the pit leveler deck 130 should be lowered to allow the doors to swing (both opened and closed (after completion of a loading/unloading task) and raised during and after the loading/unloading task is complete. FIG. 7 shows a tool 700 that allows for reduced operating costs and entails minimal disruption in dock operations. The tool 700 consists of an angled bar 710 with a sturdy metal hook 720 on the distal end and a (e.g. T-shaped) handle 730 on the proximal end. At the angle joint 740 is a set of relatively small wheels 742 that act as a fulcrum and allow the user to push down on the T-handle 730, and thereby pivot (double-curved arrow 750) the tool 700 about the wheel axis 752. In operation, the hook 720 of the tool 700 removably engages a pull-chain or cable 470 (shown in phantom beneath the deck 130), located in the center (e.g. via hole 450 in FIG. 4) of the pit leveler deck 130 and, when pulled by pressing down on the T-handle 730, folds/pivots (curved arrows 462), on appropriate pivot axes the pit leveler safety legs (shown in phantom beneath the deck 130). By pivoting the legs 460 to fold them, it allows the pit leveler deck 130 able to drop down to its bottom-most position (as shown, e.g. in FIG. 4). In this lowered position, the vast majority of trailer swing doors are able to clear the deck 130 of the pit leveler. The specific arrangement of legs and chain/cable beneath the deck 130 can vary widely (e.g. it can also include sheaves, pulleys, etc. to guide the chain/cable), so long as the interconnection allows the legs to pivot out of an upstanding position upon actuation by a tool or other device. Note that in alternate embodiments, a more complex mechanism can raise and lower the deck such as a motorized screw drive, hydraulic ram, etc. In the depicted embodiment, the legs can be reset (if desired) by lifting the deck 130 sufficiently to allow the legs 460 to fall back into an upstanding position based upon their own weight. After the legs 460 are stood back up the deck 130 can be lowered back into its raised position supported by the upright legs.

Note that the tool can be relatively lightweight as the force required to drop the legs is relatively minimal. In an embodiment, the bar 710 is constructed from hollow, square, round, or rectangular (or another shape) aluminum alloy or steel bar stock with sufficient bend-resistance to avoid permanent/plastic deformation under stresses encountered in normal operation. Note in alternate arrangements, the bar can have a different shape, other than the depicted angled shape, such as an upwardly curved shape. In general, the shape provides a fulcrum at a mid-section, with an elevated (off ground level) handle adjacent to a proximal end and an elevated hook adjacent to a distal end. The hook can be attached directly to the end or depend from a predetermined length lead—for example a chain or cable.

In an alternate embodiment, instead of lowering shelf segments (160) of the warehouse floor by cutting concrete, or in some instances, in addition to cutting, the system and method can entail constructing a low ramp under the tires of the trailer in front of the dock opening. While the ramp typically only needs to be approximately 2-4 inches in overall height, it accommodates for a few edge-case (outlier) trailers in a fleet that are lower-slung, and their doors may not be able to otherwise clear the pit leveler deck in its bottom-most position.

Another embodiment of the illustrative system and method entails cutting and widening of a dock door frame (110) to allow for more room for a trailer to be parked of-center, and still allow for swinging of its doors beyond 90 degrees, whilst clearing the pit leveler.

In operation, the following steps of a trailer loading/unloading method herein can be employed:

1. Trailer arrives at the dock and pit leveler deck is lowered to its bottom-most position using the ergonomic tool or another actuation mechanism.
   (a) Raise pit leveler off of the safety legs using the tool by activating pit leveler pull chain to release safety legs, and lower leveler to bottom-most position (or position sufficient to provide clearance for lugs).
   (b) Once leveler is lowered using the tool, trailer doors clear pit leveler deck and are swung open.
2. With no modifications made to existing dock door opening; with pit leveler deck lowered, vast majority of trailer doors swing open and clear the edge of the pit. However, in many instances, the swing door's bottom cam lock lug makes contact with the concrete sill edge of the pit.
3. Concrete on sill edge of pit has been previously cut down to allow the lug to clear the edge of the pit and the door is swung clear of the active warehouse loading zone.
   (a) The cut is a small section of concrete 3-4 inches deep/thick, 12-16 inches wide, and 24-4 inches long to create opposing shelves in the sill edge. Doors can now be swung past the sill edge with clearance for the lugs. Thus, such minor concrete cutting along both sills of existing pit allows swing doors to be able to sweep out of the way of conventional dock loading equipment.
   (b) For safety purposes, once swung out the swing doors can be secured to the existing bollard and a leading-edge guard is added to protect the open trailer door.
4. Pit leveler deck can be raised back into position using the tool or another device and loading or unloading task occurs using loading dock equipment and/or personnel.
5. When loading or unloading task is complete, pit leveler deck is again lowered using the tool (if previously raised in step 4) and swing doors are detached and swung back to closed position on trailer and locked. Pit leveler can again be raised using the tool. Trailer departs the dock.

II. Door Guard

Figure 8:
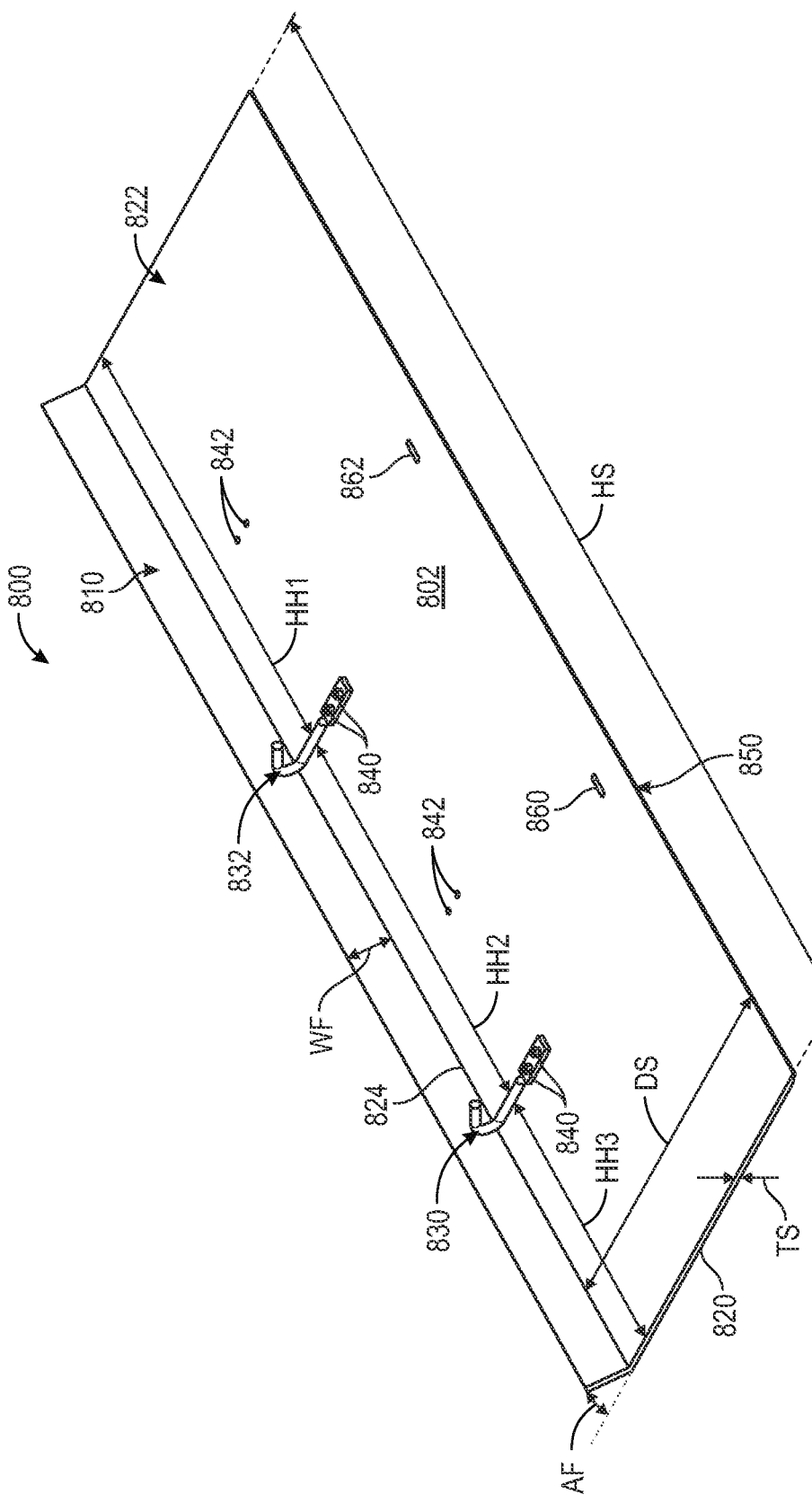
FIG. 8 is a perspective view of a protective door panel according to an exemplary embodiment.

FIG. 8 shows a resilient, protective panel (also termed a "door guard") 800 for use in covering the lower, inside face of a trailer door when it is opened at a loading dock as described above (and shown in FIGS. 9 and 10, further described below). The panel 800 can be constructed from a variety of durable (typically rigid and/or semi-rigid so as to maintain a molded shape while mounted) materials—for example, PVC, PTFE, polyethylene, high-density polyethylene (HDPE) (or a similar, semi-rigid polymer, and/or mixtures of and such polymers), lightweight metal sheeting having a thickness TS between approximately 0.25 and 0.5 inch. The sheet is generally rectangular, as shown with a flat section 802 that defines a height HS of between approximately 48 and 72 inches (between opposing top and bottom edges 820 and 822), and a flat depth DS of approximately _ 36 and 54 inches. The depth DS is chosen to substantially cover the depth/width of a standard trailer door (e.g. door 120 described above). The panel 800 includes a folded edge/flap 810 runs the full height HS of the panel 800, and that defines a width WF of approximately 1 to 6 inches. The flap 810 extends outwardly from a fold line 824 at a non-parallel and (typically) non-perpendicular, acute angle AF, relative to the plane defines by the flat section 802.

Figure 10:
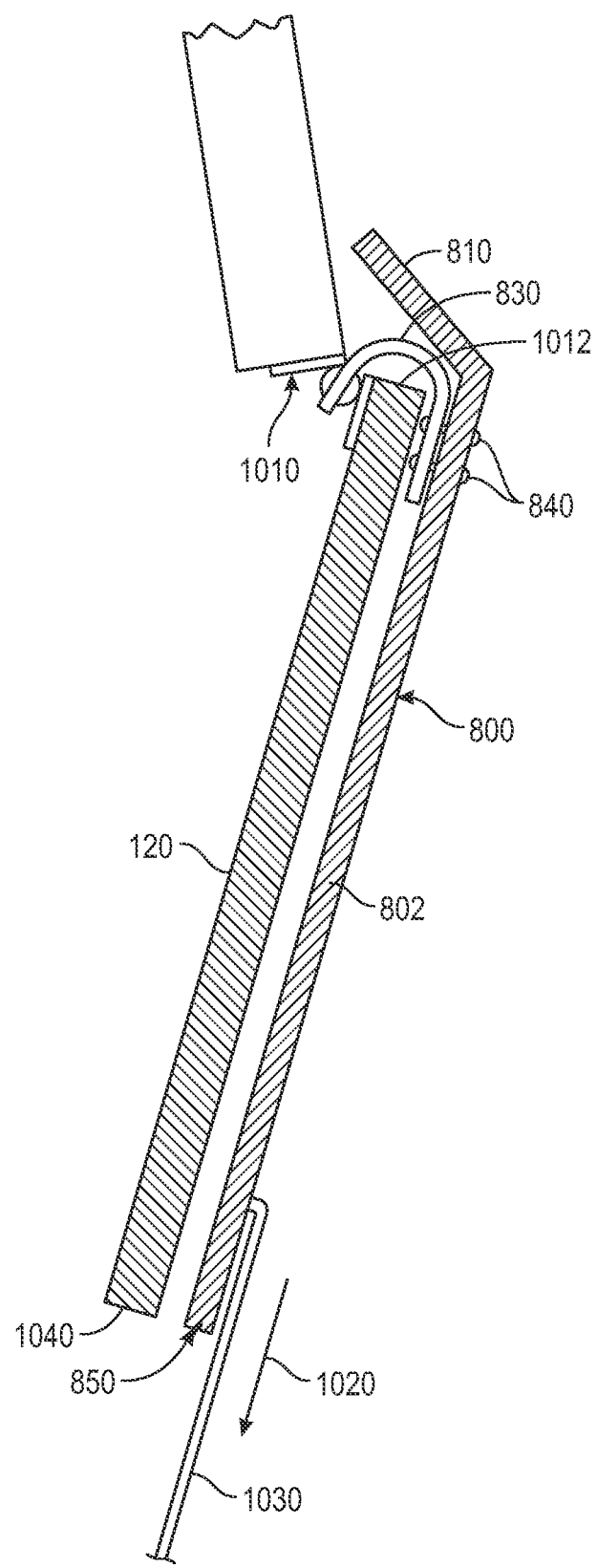
FIG. 10 is a partial top cross section of the protective panel of FIG. 8 mounted on a door, showing the positioning of one of the J-hooks thereof with respect to a trailer door hinge.

The depicted panel 800 includes a pair of commercially available, metal (e.g. galvanized or stainless steel 5 ⅛ size) J-hooks 830 and 832, that are mounted along the inside surface of the flat section 802, as shown, and extend rearwardly past the angled flap fold line 824. These hooks 830, 832 are used to hang and retain the panel 800 with respect to the trailer door as shown and described below. The hooks 830, 832 can be mounted at any acceptable location along the height of the panel. In general, two or more hooks are provided to each panel in alignment with typical door hinge locations. The panel 800 includes (optionally) pre-drilled holes 842 for receiving bolt and nut sets (840) that secure each hook. Thus, hooks can be relocated on the panel as appropriate to accommodate a variety of differing hinge arrangements, as well as allowing one panel to be reversed and mounting on each of opposing doors (FIG. 10, below). That, is, each panel can be set up so that either opposing edge 820 or 822 is the bottom edge, and the other is the top edge. As shown, edge 820 is the top edge and opposing edge 822 is the bottom edge. Note that it is contemplated that the user can also drill custom holes to accommodate hooks in a particular door hinge arrangement. The material is sufficiently pliable to make drilling relatively straightforward with basic tools. In the illustrative embodiment, a lower hook 832 is spaced at a height/distance HH1 from the bottom edge 822 of approximately 25 inches. The upper hook 830 is spaced from the lower hook 832 at a height/distance HH2 of approximately 20 inches. In this example, holes 842 for mounting hooks can be predrilled at intervals of 9-11 inches. Note that the distance HH1 between the lower hook 832 and bottom edge 822 is longer than the distance HH3 between the upper hook 830 and the top edge 820 in the exemplary arrangement. In alternate arrangements, different spacings between hooks and/or top/bottom panel edges can be employed. Likewise, a greater or lesser number of hooks can be employed than the depicted two hooks, depending upon a variety of factors, including (but not limited to) trailer door hinge placement and/or overall panel height HS.

Adjacent to the front edge 850 of the panel 800 are two or more elongated slots 860, 862, each adapted to receive a strap of a narrow, non-elastic or elastic web material. The strap(s) can be permanently affixed to the panel by bolts or other mechanisms in alternate arrangements.

Figure 9:
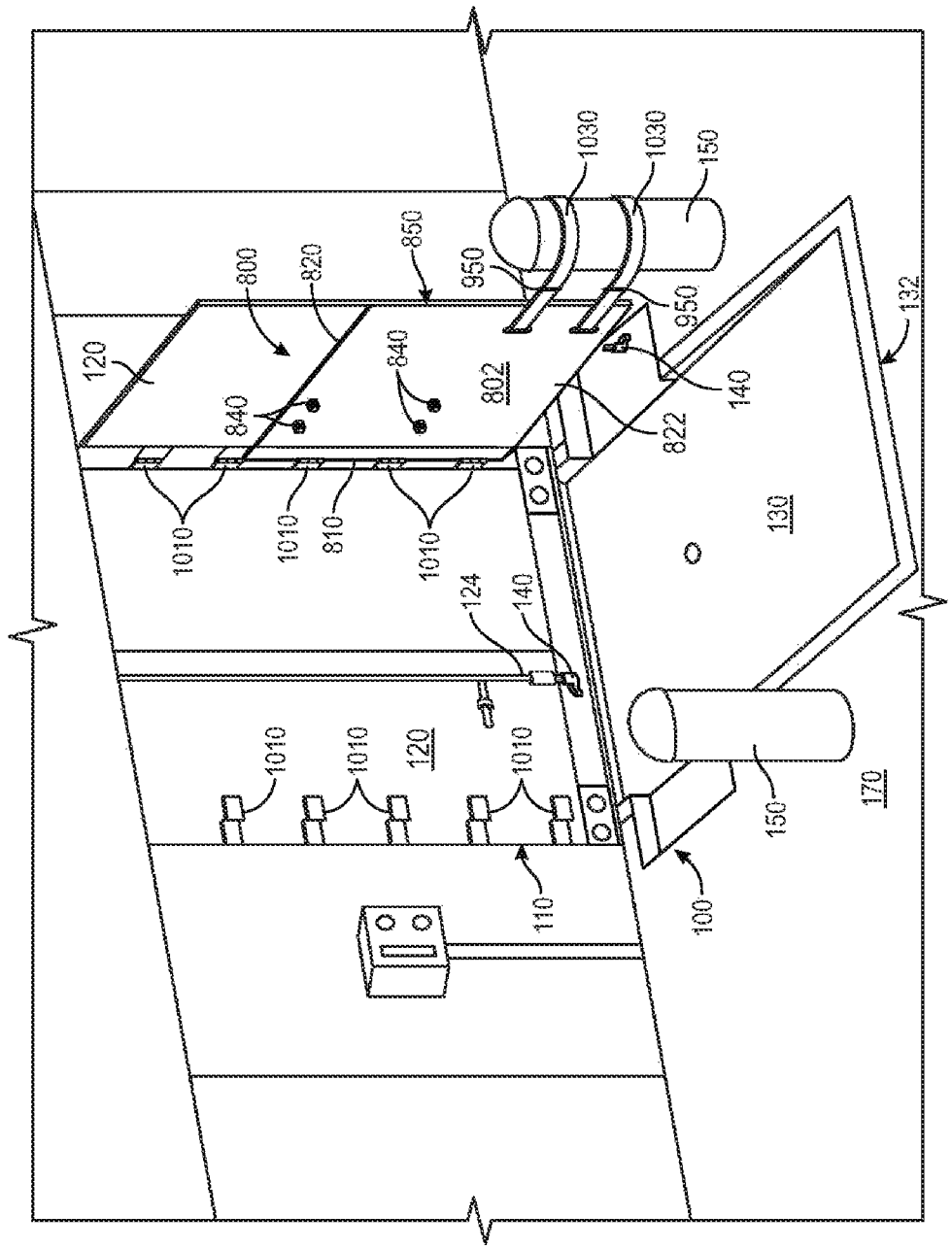
FIG. 9 is a perspective view of the protective door panel of FIG. 8, shown in operation in a modified loading dock environment according to the various embodiments herein.

Referring also to FIGS. 9 and 10, the panel 800 is shown mounted to a trailer door 120 of a type described above (see, for example FIG. 6). Note that the depiction in FIG. 10 is a top-down view of the panel 800 installed on an opposing door from that shown in FIG. 9 (and as arranged in FIG. 8. Thus, the hooks would be mounted at the empty bolt holes 842 in this opposite-side arrangement. Alternatively, the hooks can be mounted to serve trailer doors that have unconventionally spaced hinges—as some trailers have variability based upon type, model, etc. Predrilled, or custom holes can be provide to each panel to serve particular types of doors and associated hinge arrangements. The mounting geometry for each opposing trailer door (and/or different types/arrangements of doors) and procedure for attachment is the same. Thus similar reference numbers are used for both sides. The door 120 includes exemplary hinges 1010, which are placed at predetermined locations along the height of the trailer door frame to adequately support the weight of the door and provide desired security. The panel 800 is mounted so that the curved section of each J-hook 830 (and 832) passes around the inner edge 1012 of the door 120 (FIG. 10) and resides just above the hinge 1010. In this manner, the hook 830 (and 832) restrains the rear of the panel 800 against outward movement (arrow 1020) and restrain the panel 800 from falling vertically via the force of gravity. As such, and as depicted in FIG. 9, the panel 800 fully covers the lower area of the door's inside face in a stationary manner while mounted. The panel 800 is maintained against the door, engaging the rear edge 1012 by straps 1030 that are passed through (or otherwise secured to) the slots 860, 862 in the panel. In this example, the straps extend to, and warp around bollards 150 as shown. The straps 1030 can be attached to other appropriate structures (e.g. safety railings) in a manner clear to those of skill. The straps 1030 are buckled (e.g. buckles 950) as shown, or can employ hook-and-loop fasteners, knots, elastics, etc. can be to provide a secure and taut bias (arrow 1020) to each panel 800 relative to a stationary object in the loading dock. In alternate embodiments, other securing structures can be employed, including clamps that engage front/outer door edge 1040. The depicted strap arrangement allows for both panel securement to the door and restraint of the door in an open position that is (typically) past perpendicular from the closed orientation so that the opened and secured door(s) do not interfere with movement into and out of the trailer body. As also depicted, the inwardly folded flap 810 on each panel 800 assists in protecting the inner edge 1012 of the opened door 120, by deflecting any impacts that would otherwise catch the door edge 1012, such as when a forklift passes by.

Note that the height HS of the panel 800 is sufficient to cover the area that is likely to be encountered by equipment and goods passing into, and out of, the trailer. Thus, the height HS can be less than (or alternatively approximately equal to) the overall trailer door height. Likewise with panel depth or width DS is sufficient to fully extend along the door width so as to provide full coverage in a manner free of substantial excess forward extension beyond the door front edge.

Note also that the strap(s) 1030 can comprise any type of elongated flexible member that allows the front edge of the door to be secured relative to a remote stationary object. For example, the elongated flexible member can comprise at least one of a non-elastic strap, an elastic strap, a shock cord, a non-elastic cord, and a cable, among other tie-down arrangement.

In operation a trailer backs into the loading dock using a manual or automated yard truck and/or OTR truck. The procedure can occur as follows:

(a) The door(s) are swung open into (e.g.) the modified dock with adjusted pit leveler and the user retrieves a protective panel that is an appropriately sized and arranged (i.e. hook placement matching the door hinge placement);

(b) The user then secures the panel to the inner face of the trailer door in a manner that is approximately flush with the door lower and outer edge, passing the J-hooks around the door rear edge and resting them on the top sides of confronting door hinges; and (c) The user then grasps each of the straps at the outer ends of the panel and secures them around a stationary object (e.g. bollard, railing, etc.), and makes the connection taut so the panel(s) are secured to the door and the door is held open. The door(s) are now arranged to substantially avoid interference with equipment and goods passing into and out of the trailer and to deflect impacts that may inadvertently contact the door(s). The rigid nature of the panel material absorbs such impacts and resists puncture. The material helps to spread the force of a sharp impact over a wider area so as to avoid scuffing, denting or piercing the door. Advantageously, the fitment and securing of the panel takes minimal additional time when compared to securing a door alone and, in fact, provides a ready and repeatable system for holding doors open that is free of damage to the door.

III. CONCLUSION

It should be clear to those of skill that the above-described systems and methods for modifying loading docks, holding open and protecting opened trailer doors addresses a variety of issues that arise when operating an automated yard truck fleet in an environment that may be adapted for conventional, manual operations. The additional equipment and modifications provided herein are straight forward and readily adapted to various loading dock and yard environments, while still allowing for conventional (i.e. manual) operations.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments of the apparatus and method of the present invention, what has been described herein is merely illustrative of the application of the principles of the present invention. For example, as used herein, various directional and orientational terms (and grammatical variations thereof) such as "vertical", "horizontal", "up", "down", "bottom", "top", "side", "front", "rear", "left", "right", "forward", "rearward", and the like, are used only as relative conventions and not as absolute orientations with respect to a fixed coordinate system, such as the acting direction of gravity. Also, qualifying terms such as "substantially" and "approximately" are contemplated to allow for a reasonable variation from a stated measurement or value can be employed in a manner that the element remains functional as contemplated herein—for example, 1-5 percent variation. Accordingly, this description is meant to be taken only by way of example, and not to otherwise limit the scope of this invention.

What is claimed is:

1. A loading dock leveler deck height control apparatus, including an operator end force-responsive tool working cooperatively with a leveler deck, a set of safety legs, and a safety leg release link to establish clearance over the leveler deck for locking lugs of trailer swing doors while swinging open, the control apparatus comprising:
  an operator force-responsive leveler deck height adjustment tool configured with an operative end and an operator end, wherein the leveler deck height adjustment tool is adapted to:
    (i) in response to a first upward force applied to the operator end, lower a portion of the operative end at least partially through an aperture in the leveler deck and engage a leveler deck safety leg release link;
    (ii) in response to a first downward force applied to the operator end, raise the leveler deck off of the safety legs and activate the safety leg release link; and
    (iii) in response to a second upward force applied to the operator end, lower the leveler deck to a trailer swing door lug clearing position and disengage the leveler deck,
  wherein the aperture of the leveler deck is configured to facilitate the portion of the operative end of the leveler deck height adjustment tool activating the safety leg release link and raising the leveler deck in response to the first downward force applied to the operator end, and
  wherein the leveler deck height control apparatus operates the leveler deck to establish clearance for locking lugs of trailer swing doors while swinging open through cooperative function of the operator end force-responsive tool, the leveler deck, the safety legs, and the safety leg release link.

2. The apparatus as set forth in claim 1, wherein the tool comprises an angled bar having a handle adjacent to a proximal end and a hook, for engaging the link, adjacent to an opposing distal end, and wherein the bar includes wheels that provide a fulcrum adjacent to an angled joint in the bar.

3. The apparatus as set forth in claim 2, wherein the loading dock further comprises a restraint that maintains the trailer swing doors in the swung open position.

4. The apparatus as set forth in claim 3, wherein the safety legs of the deck are adapted so as to be movable out of a supporting position.

5. The apparatus as set forth in claim 4, wherein the link comprises a chain or cable interconnected with the legs.

6. The apparatus as set forth in claim 2, wherein the restraint is adapted to locate the trailer swing door so as to be generally behind by a protective device.

7. The apparatus as set forth in claim 6, wherein the protective device comprises a bollard or other upright projecting structure.

8. The apparatus as set forth in claim 2, further comprising, a protective panel for covering and securing at least one of the trailer swing doors, including, a resilient material sheet with a first hook, located at an inner edge, that engages an inner edge of the at least one of the trailer swing doors in a location residing in contact with a top end of a first hinge of the at least one of the trailer swing doors, and a substantially taut, elongated flexible member that extends from an attachment location on a front edge of the sheet to the stationary object, and is secured thereto.

9. The apparatus as set forth in claim 8, further comprising, a second hook, located at the inner edge of the sheet, that engages the inner edge of the at least one of the trailer swing doors in a location residing in contact with a top end of a second hinge of the at least one of the trailer swing doors.

10. The apparatus as set forth in claim 9, wherein the elongated flexible member comprises at least one of a non-elastic strap, an elastic strap, a shock cord, a non-elastic cord, and a cable.

11. The apparatus as set forth in claim 10, further comprising, a plurality of non-elastic straps, elastic straps, shock cords, non-elastic cords, or cables that extend from respective attachment locations on the front edge of the protective panel to the stationary object, and are secured thereto.

12. The apparatus as set forth in claim 11, further comprising, mounting locations for at least one of the first hook and the second hook positioned on the sheet based upon 3 locations of hinges on at least one of the trailer swing doors.

13. The apparatus as set forth in claim 12, wherein at least one of the first hook and the second hook are affixed by fasteners to one of a plurality of sets of pre-drilled holes on the sheet.

14. The apparatus as set forth in claim 13, wherein the sheet includes an inwardly angled flap, unitary therewith, that is constructed and arranged to cover at least a portion of the inner edge of the at least one of the trailer swing doors.

* * * * *